US008645907B2

(12) United States Patent
Jain et al.

(10) Patent No.: US 8,645,907 B2
(45) Date of Patent: Feb. 4, 2014

(54) CAPTURING EFFORT LEVEL BY TASK UPON CHECK-IN TO SOURCE CONTROL MANAGEMENT SYSTEM

(76) Inventors: Sandeep Jain, Palo Alto, CA (US); David Knight, Belmont, CA (US)

( * ) Notice: Subject to any disclaimer, the term of this patent is extended or adjusted under 35 U.S.C. 154(b) by 1037 days.

(21) Appl. No.: 11/853,782

(22) Filed: Sep. 11, 2007

(65) Prior Publication Data

US 2008/0066071 A1    Mar. 13, 2008

Related U.S. Application Data

(60) Provisional application No. 60/844,309, filed on Sep. 12, 2006.

(51) Int. Cl.
*G06F 9/44* (2006.01)
*G04G 7/00* (2006.01)

(52) U.S. Cl.
USPC .............................. 717/101; 717/102; 702/178

(58) Field of Classification Search
None
See application file for complete search history.

(56) References Cited

U.S. PATENT DOCUMENTS

| 5,574,898 | A | * | 11/1996 | Leblang et al. ................ 1/1 |
| 5,717,867 | A | * | 2/1998 | Wynn et al. .................... 705/32 |
| 5,765,140 | A | * | 6/1998 | Knudson et al. .............. 705/7.15 |
| 6,338,097 | B1 | * | 1/2002 | Krenzke et al. ............... 719/329 |
| 6,405,364 | B1 | * | 6/2002 | Bowman-Amuah ........ 717/101 |
| 6,438,743 | B1 | * | 8/2002 | Boehm et al. ................. 717/102 |
| 6,601,233 | B1 | * | 7/2003 | Underwood .................. 717/102 |

(Continued)

FOREIGN PATENT DOCUMENTS

| JP | 03-094331 | 4/1991 |
| JP | 05-216651 | 8/1993 |
| JP | 05-233238 | 9/1993 |
| JP | 2006-65521 | 3/2006 |

OTHER PUBLICATIONS

Per Cederqvist et al., "Version Management with CVS for CVS 1.11.22", 2005, Free Software Foundation, Inc., [retrieved on May 17, 2011]. Retrieved from Internet >URL:http://ftp.gnu.org/non-gnu/cvs/source/stable/1.11.22/cederqvist-1.11.22.pdf>; pp. 1-174.*

(Continued)

*Primary Examiner* — Thuy Dao
*Assistant Examiner* — Xi D Chen
(74) *Attorney, Agent, or Firm* — Barry Choobin; Patent 360 LLC (57) ABSTRACT

Techniques are provided for capturing the ID of a work item, and the corresponding effort level information, as a part of the actual check-in process of the artifacts into the underlying change management system. This effort information can then be propagated to an external system for subsequent reporting and analysis. In one embodiment, tasks (or similar items such as issues or bugs) are entered into a common task or issue tracking system. As part of this process each task is assigned a unique identifier. A "call-out" is added to the source control management system which captures the effort level and task ID associated with the proposed change. The data entered is validated to ensure that the task ID is valid and that the effort entered is within a valid range. If the data entered is valid, the change to the underlying artifact is allowed to proceed and the effort and task information is stored for later analysis. If the data is not valid, the proposed change is rejected and an appropriate error message is returned to the user.

12 Claims, 5 Drawing Sheets

(56) References Cited

U.S. PATENT DOCUMENTS

| | | | |
|---|---|---|---|
| 6,751,650 B1* | 6/2004 | Finch et al. | 709/203 |
| 7,072,793 B2* | 7/2006 | Lehman | 702/178 |
| 7,139,999 B2* | 11/2006 | Bowman-Amuah | 717/101 |
| 7,194,385 B2* | 3/2007 | Flautner et al. | 702/178 |
| 7,286,999 B2* | 10/2007 | Majd et al. | 705/8 |
| 7,562,029 B2* | 7/2009 | Majd et al. | 705/8 |
| 7,587,677 B2* | 9/2009 | Yamamoto et al. | 715/752 |
| 7,631,006 B2* | 12/2009 | Hagstrom et al. | 1/1 |
| 7,653,893 B2* | 1/2010 | Neumann et al. | 717/101 |
| 7,702,909 B2* | 4/2010 | Vainstein | 713/178 |
| 7,739,653 B2* | 6/2010 | Venolia | 717/101 |
| 7,801,834 B2* | 9/2010 | Frohnhoefer et al. | 705/400 |
| 7,818,197 B2* | 10/2010 | Cho et al. | 705/7.21 |
| 8,225,271 B2* | 7/2012 | Eldridge et al. | 717/102 |
| 8,225,302 B2* | 7/2012 | Waugh et al. | 717/170 |
| 8,312,415 B2* | 11/2012 | Marius et al. | 717/101 |
| 8,375,361 B2* | 2/2013 | Bell et al. | 717/102 |
| 2001/0034675 A1* | 10/2001 | Belford et al. | 705/30 |
| 2002/0059294 A1 | 5/2002 | Bottarelli et al. | |
| 2002/0083024 A1* | 6/2002 | Myers | 705/500 |
| 2002/0152316 A1* | 10/2002 | Dietz et al. | 709/229 |
| 2002/0165742 A1* | 11/2002 | Robins | 705/7 |
| 2003/0195717 A1* | 10/2003 | Lehman | 702/178 |
| 2003/0204367 A1* | 10/2003 | Hartigan et al. | 702/178 |
| 2004/0205657 A1* | 10/2004 | Kudo et al. | 715/530 |
| 2004/0255265 A1* | 12/2004 | Brown et al. | 717/101 |
| 2005/0114829 A1* | 5/2005 | Robin et al. | 717/101 |
| 2006/0218521 A1* | 9/2006 | Hagstrom et al. | 717/101 |
| 2006/0236301 A1* | 10/2006 | Minium et al. | 717/101 |
| 2007/0061782 A1* | 3/2007 | Schreiner et al. | 717/124 |
| 2007/0156731 A1* | 7/2007 | Ben-Zeev | 707/101 |
| 2008/0066049 A1* | 3/2008 | Jain et al. | 717/101 |
| 2012/0065932 A1* | 3/2012 | Catipon et al. | 702/178 |
| 2012/0317541 A1* | 12/2012 | Kaulgud et al. | 717/102 |

OTHER PUBLICATIONS

Barr W. Boehm, and Philip N. Papaccio, "Understanding and Controlling Software Costs", IEEE Transactions on Software Engineering, vol. 14, No. 10, Oct. 1988; [retrieved on May 18, 2011 from http://faculty.salisbury.edu/~xswang/Research/Papers/SERelated/RiskManagement/PrincipleandPractices.pdf>; pp. 1462-1477.*

Meier, et al., "How to : Create Custom Check-in Policies in Visual Studio Team Foundation Server"; Sep. 2007, published online; [retrieved on Nov. 3, 2011]; Retrieved from Internet <URL:http://msdn.microsoft.com/en-us/library/bb668980.aspx>; pp. 1-5.*

Author unknown, "Walkthrough: Customizing Check-in Policies and Notes", publish date unknown, published online; [retrieved on Nov. 3, 2011]; Retrieved from Internet <URL:http://msdn.microsoft.com/en-us/library/ms181281(v=VS.80).aspx>; pp. 1-3.*

Chang, et al., "TrustForge: Flexible Access Control fro Collaborative Crowed-Sourced Environment"; 2013 IEEE; [retrieved on Sep. 25, 2013]; Retrieved from Internet <URL:http://ieeexplore.ieee.org/stamp/stamp/jsp?tp=&arnumber=6596065>;pp. 291-300.*

Wloka, et al., "Safe-Commit Analysis to Facilitate Team Software Development"; 2009 IEEE; [retrieved on Sep. 25, 2013]; Retrieved from Internet <URL:http://ieeexplore.ieee.org/stamp/stamp/jsp?tp=&arnumber=507054>; pp. 507-607.*

Galvis, Winbladh, "Analysis of User Comments: An Approach for Software Requirements Evolution"; 2013 IEEE; [retrieved on Sep. 25, 2013]; Retrieved from Internet <URL:http://dl.acm.org/citation.cfm?id=2486788>;pp. 582-591.*

Smith, Smarkusky, "Competency Matrices for Peer Assessment of Individuals in Team Projects"; 2005 ACM; [retrieved on Sep. 25, 2013]; Retrieved from Internet <URL:http://dl.acm.org/citation.cfm?id=1059714>;pp. 155-162.*

"Notification of Transmittal of the International Search Report and the Written Opinion of the International Searching Authority, or the Declaration" received in corresponding PCT case International application No. PCT/JUS2007/078293 dated Feb. 19, 2008 (12 pages).

European Search Report received in International Application No. 07842349.8 dated Jan. 7, 2010 (6 pages).

Current claims of International Application No. 07842349.8 dated Jun. 5, 2009 (2 pages).

U.S. Appl. No. 11/853,778, filed Sep. 11, 2007, Notice of Allowance, Mailing Date Sep. 10, 2010.

* cited by examiner

CAPTURING EFFORT LEVEL BY TASK UPON CHECK-IN TO SOURCE CONTROL MANAGEMENT SYSTEM

PRIORITY CLAIM

This application claims the benefit of the provisional patent application Ser. No. 60/844,309 filed Sep. 12, 2006, the contents of which are incorporated herein by this reference.

FIELD OF THE INVENTION

The present invention relates to the capturing of effort (time) expended on individual tasks in software development and related disciplines such as Computer Aided Design (CAD), Chip Design, Board Design etc.

BACKGROUND

A key requirement for effectively managing software development and similar projects is the ability to track effort level information (i.e. how many hours were spent on performing the activity) for a particular task or activity. This information is critical in assessing whether a project is on schedule and is often used to determine the cost and/or billing of a particular project.

Existing systems of tracking effort level require the user to first check in their artifacts in various systems such as the source control management (SCM) system and then go to a separate time tracking system and enter their effort level information for the particular task. The problem with this set up is that people often forget to update the time tracking system after "checking in" their artifacts. Also, since one may update the time tracking system sometime after the actual completion of work, it is likely that it will have less accuracy than information which is input at the time the change is made.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for capturing the ID of a work item, and the corresponding effort level information, as a part of the actual check-in process of the artifacts into the underlying change management system. This effort information can then be propagated to an external system for subsequent reporting and analysis. A summary of the steps involved in this process are outlined below.

Tasks (or similar items such as issues or bugs) are entered into a common task or issue tracking system. As part of this process each task is assigned a unique identifier.

A "call-out" is added to the source control management system which captures the effort level and task ID associated with the proposed change.

The data entered is validated to ensure that the task ID is valid and that the effort entered is within a valid range.

If the data entered is valid, the change to the underlying artifact is allowed to proceed and the effort and task information is stored for later analysis. If the data is not valid, the proposed change is rejected and an appropriate error message is returned to the user.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Major Components

Figure 1:
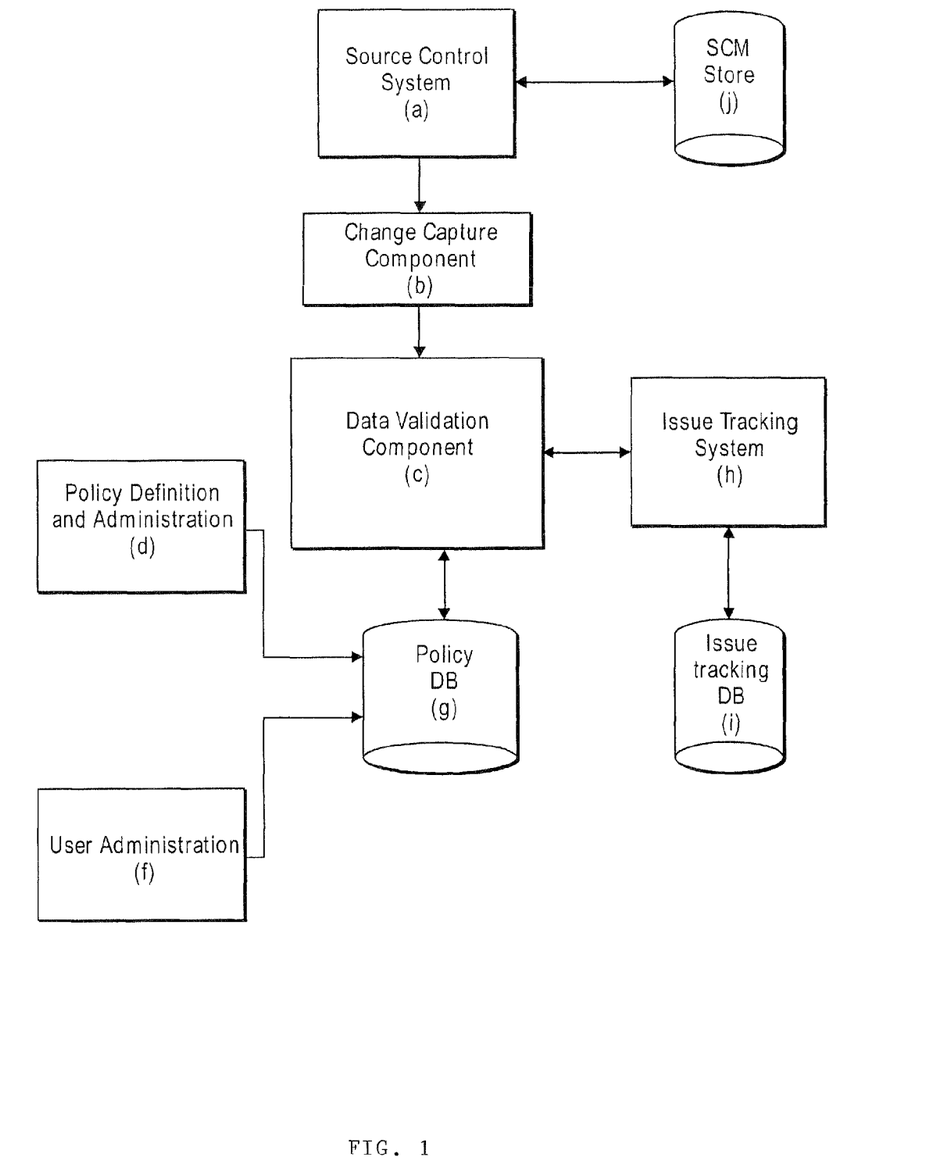
FIG. 1 is a block diagram of a system that may be used for capturing, validating and recording effort levels, according to an embodiment of the invention.

FIG. 1 illustrates the major components of a system designed to implement the techniques described herein. FIG. 1 also illustrates the relationship between those components and existing systems. A system that implements the techniques described herein may work with existing Source Control Management (SCM) systems (FIG. 1 (*a*) & (*j*)). These systems are sometimes also referred to as software change management systems. Popular examples of SCM systems include but are not limited to CVS, PVCS, Clear Case, Accurev, Subversion and Perforce. SCM systems are designed to capture, store and manage access and provide version control for software source files, designs and similar files. SCM systems have basic facilities to allow or deny changes, the invention extends these facilities to capture effort and related task information as part of the routine change management process.

The Change Capture component (FIG. 1 (*b*)) intercepts proposed changes in the SCM system and captures the required effort and task information related to the proposed change, "calls out" to the Data Validation Component (FIG. 1 (*c*)) passing along all relevant details of the proposed change and receives the response from the Data Validation Component (accept, reject etc.). To facilitate the proper entry of the data, the change control component inserts a template into the SCM system commit form to allow users to enter appropriate information (A sample screen capture of the form template is show in FIGS. 3*a* (form template in notepad editor) and 3*b* (form template in eclipse)). Depending on the response, the Change Capture component either allows the proposed change to proceed into the SCM system or rejects it and provides the user with an appropriate error message.

The Data Validation component (FIG. 1 (*c*)) validates that the task ID is valid and that the hours entered are within an acceptable range. It takes input from the Change Capture components, retrieves the valid data ranges and other information from the Policy DB (FIG. 1(g)). It can also call out to the Issue Tracking System to validate Issue IDs or retrieve relevant information.

The Policy Administration Component (FIG. 1 (d) and (f)) allows the administrator to define and manage valid data ranges and userIDs for authorized users. The information defined in this component is stored in the Policy DB (FIG. 1(g)). The Policy DB (FIG. 1 (g)) stores the policy rules and related information along with the names and userIDs of authorized users. This DB would typically be implemented using an industry standard relational database management system (RDBMS), although other implementations would be acceptable.

As with SCM systems, the techniques described herein are designed to work with existing Issue Tracking Systems and Issue Tracking Databases (FIG. 1 (h) and (i)). These systems are used to record and track both tasks that need to be completed for a project as well as open bugs and issues. Common examples of these systems include, but need not be limited to Bugzilla and Team Track.

Capturing, Validating and Recording Effort Level by Task

Figure 2:
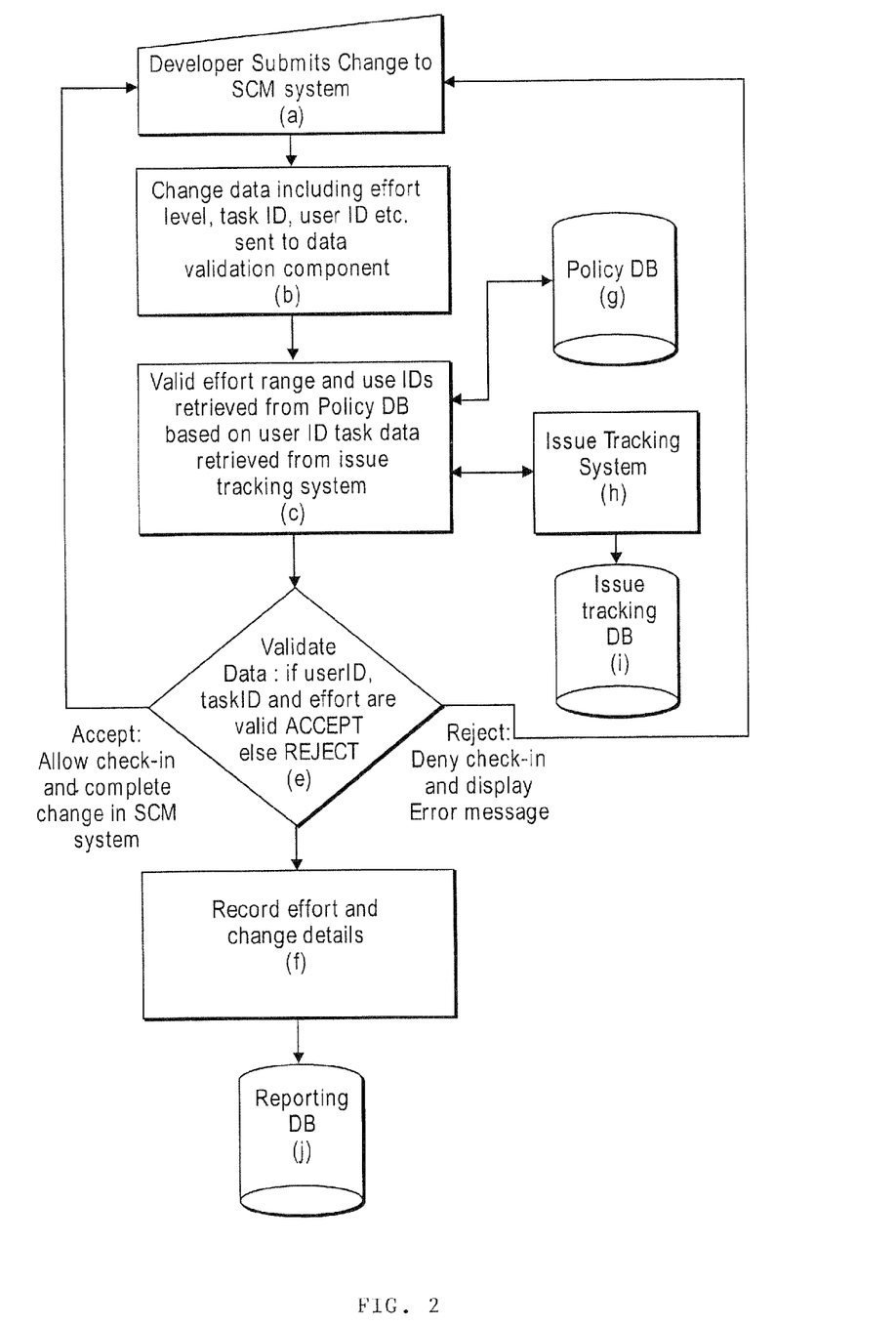
FIG. 2 is flowchart illustrating a process flow for capturing, validating and recording effort levels, according to an embodiment of the invention.

FIG. 2 outlines the process flow for capturing, validating and recording the effort level by task evaluating using the components described above. The process begins with the developer submitting the proposed change(s) to the source control system (FIG. 2, (a)).

When the change is submitted the variables necessary (user, taskID and effort) to evaluate the requested change are captured as part of this process. The data captured is outlined below:

Since any user submitting a change would have already been authenticated by the SCM system, the userID of the requesting user would be automatically captured by the system The taskID associated with the proposed change Effort level (typically expressed in minutes, hours or days)

Any other variable which might be helpful in subsequent analysis of the effort data such as root cause.

Once the developer has submitted the change, the program sends the information captured to the Data Validation Component (FIG. 2, (b)). Note, the changes are not "committed" to the source control system at this time, but are held in an in-process state.

When the Data Validation Component receives the proposed changes (FIG. 2, (c)), the program retrieves the information necessary and validates that the taskID is valid (by querying the issue tracking system) and that the effort entered is within the valid range (by retrieving this range from the Policy DB).

If either the taskID is invalid or the effort level is not within the allow range the specified the change is rejected, with the SCM system being notified to reject the change and the end-user receiving an appropriate error message. If the data values are valid, the SCM system is notified to accept the change and "commit" it to the system. At this point the effort level and associated taskID is also recorded for later reporting. The effort data captured could be sent to the issue tracking system and recorded along with there with the task or it could be stored in a separate reporting database for later analysis.

Figure 3A:
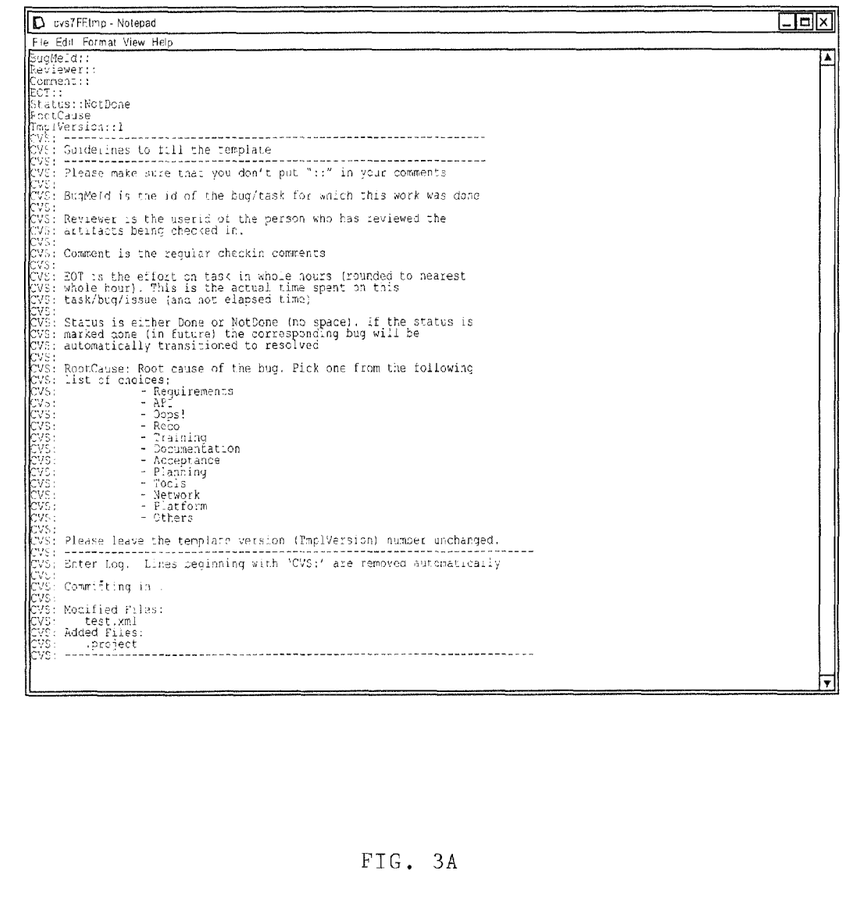
FIG. 3A is block diagram illustrating a Screen Capture showing a form template inserted in CVS notepad checkin dialog box.
Figure 3B:
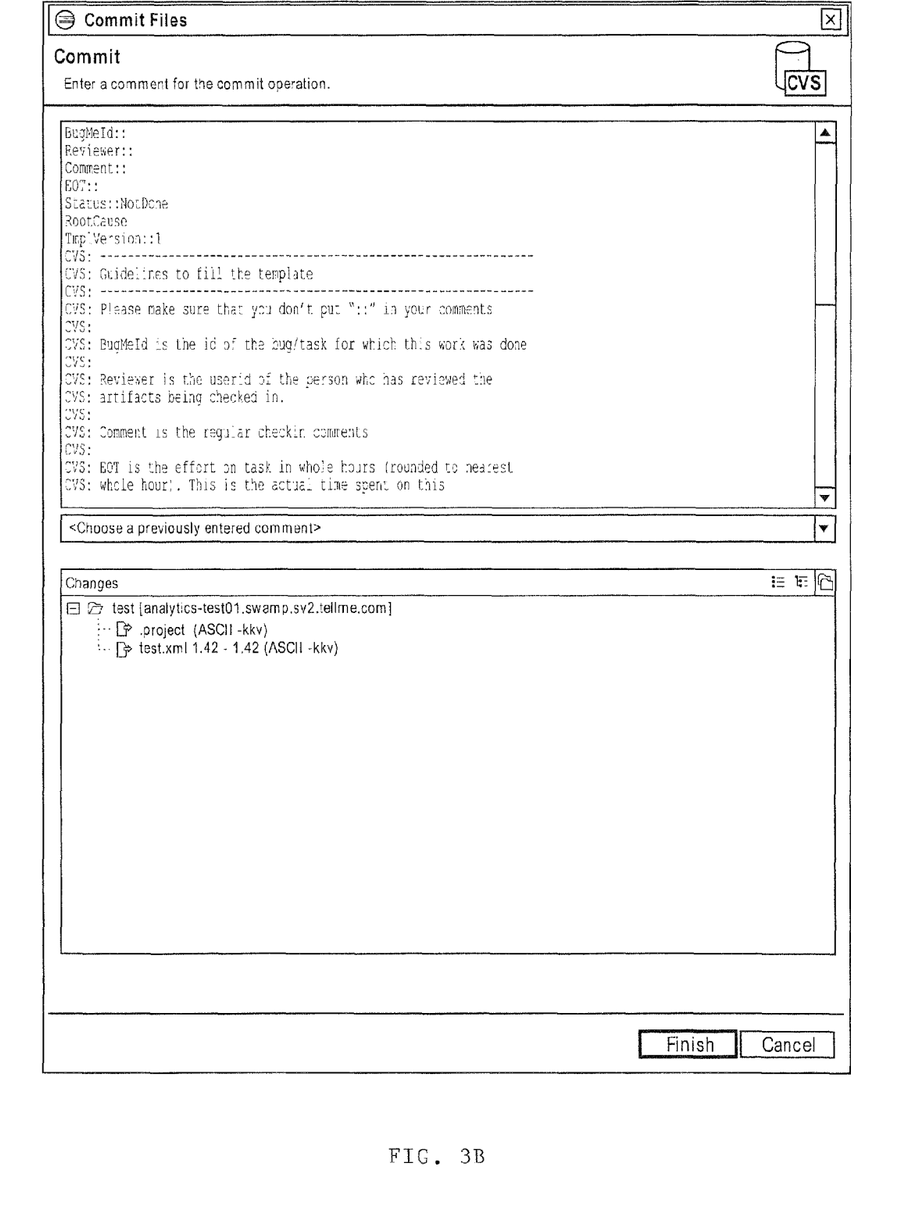
FIG. 3B is a block diagram illustrating a Screen Capture showing a form template inserted in CVS Eclipse checkin dialog box.

FIG. 3a is a block diagram illustrating a Screen Capture showing a form template inserted in CVS notepad checkin dialog box.

FIG. 3b is a block diagram illustrating a Screen Capture showing a form template inserted in CVS Eclipse checkin dialog box.

Hardware Overview

Figure 4:
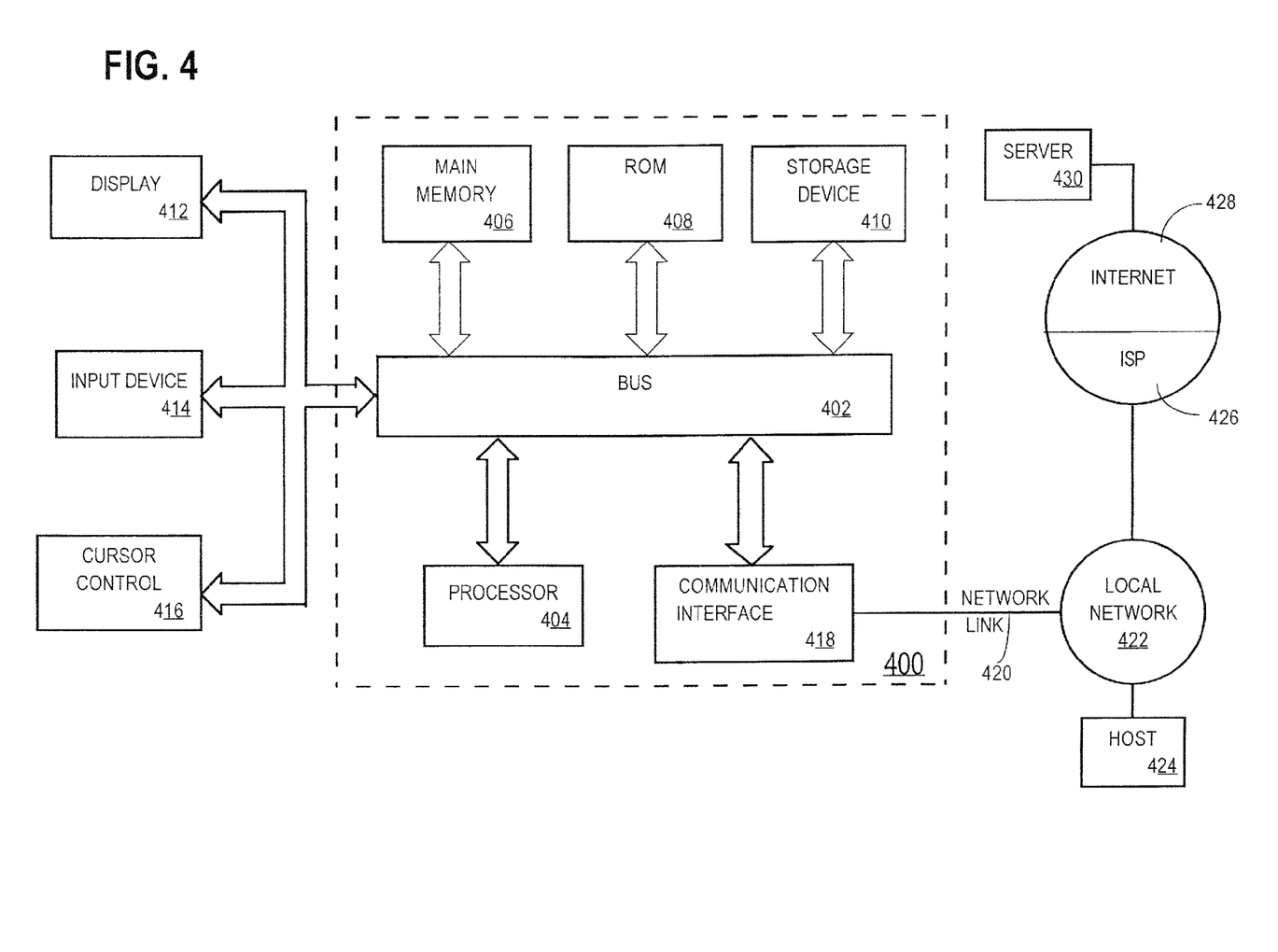
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving, at a source control management system, an input representing a proposed change to a software source file, and wherein prior to receiving the input representing the proposed change, causing to be displayed, to a user, a template that allows the user to enter information that represents the effort level associated with said proposed change, and wherein causing the template to be displayed to the user includes inserting the template into a source control management system commit form;
in response to the input, the source control management system capturing an effort level associated with the proposed change by receiving, from a user, a user-specified effort level;
wherein the effort level is a measure of how much effort required in making said proposed change and wherein the effort level is captured during a check in through a source control system and an issue tracking system, and wherein the captured effort level is a length of time required or spent in generating said proposed change;
determining, by the source control management system, whether to make said proposed change based, at least in part, on the captured effort level; in response to determining that said proposed change should be made, performing the steps of:
making said proposed change;
storing data that indicates a task ID associated with the proposed change; and
storing data, in association with the task ID, that indicates the captured effort level;
wherein determining whether to make said proposed change includes comparing the captured effort level associated with said proposed change to a range of acceptable effort levels associated with the task ID, and said proposed change is committed to the source control management system only after determining that the captured effort level associated with said proposed change is within the range of acceptable effort levels, and wherein the range of acceptable effort levels is retrieved from a policy database storing a plurality of ranges of acceptable effort levels, and wherein each range of the plurality of ranges of acceptable effort levels is associated with a particular task ID;
wherein the method is performed by one or more computing devices.

2. The method of claim 1 wherein determining that the proposed change should be made includes validating the captured effort level to ensure that the captured effort level is within a valid range.

3. The method of claim 1 wherein receiving input representing a proposed change to a software source file includes intercepting the proposed change that is being submitted to a source control management system using a change capture component.

4. The method of claim 1, wherein:
receiving said proposed change input includes receiving a changed version of the software source file, and making said proposed change includes committing the changed version to the source control management system that currently contains a prior version of the software source file.

5. The method of claim 1, further comprising in response to the input, capturing a root cause associated with said proposed change, and wherein determining whether to make said proposed change is based, at least in part, on the captured effort level and the root cause.

6. The method of claim 2, wherein:
the source control management system capturing an effort level comprises the source control management system capturing a task ID associated with the proposed change by receiving, from the user, a user-specified task ID; and
validating the captured effort level comprises validating the task ID to ensure that the task ID is a valid task ID.

7. A non-transitory computer-readable storage medium comprising instructions for:
receiving, at a source control management system, an input representing a proposed change to a software source file;
in response to the input, the source control management system capturing an effort level associated with the proposed change by receiving, from a user, a user-specified effort level;
wherein the effort level is a measure of how much effort required in making said proposed change, and wherein the captured effort level is a length of time required or spent in generating said proposed change;
determining, by the source control management system, whether to make said proposed change based, at least in part, on the captured effort level;
in response to determining that said proposed change should be made,
performing the steps of:
making said proposed change;
storing data that indicates a task ID associated with the proposed change; and
storing data, in association with the task ID, that indicates the captured effort level;
causing to be displayed, to a user, prior to receiving the input representing said proposed change, a template that allows the user to enter information that represents the effort level required for said proposed change, and wherein the instructions for causing the template to be displayed to the user include instructions for inserting the template into a source control management system commit form;
wherein the instructions for determining whether to make said proposed change include instructions for comparing the captured effort level associated with said proposed change to a range of acceptable effort levels associated with the task ID, and wherein said proposed change is committed to the source control management system only after determining that the captured effort level is within the range of acceptable effort levels;
receiving, from a policy database, the range of acceptable effort levels, and wherein the policy database contains a plurality of ranges of acceptable effort levels and each range of the plurality of ranges of acceptable effort level is associated with a particular task ID.

8. The non-transitory computer-readable storage medium of claim 7, wherein the instructions that cause determining that the proposed change should be made include validating the captured effort level to ensure that the captured effort level is within a valid range.

9. The non-transitory computer-readable storage medium of claim 7 wherein the instructions that cause receiving input representing a proposed change to a software source file include intercepting the proposed change that is being submitted to a source code management system, with a change capture component.

10. The non-transitory computer-readable storage medium of claim 7, wherein:
the instructions that cause receiving said input include instructions for receiving a changed version of the software source file, and making said proposed change includes committing the changed version to the source control management system that currently contains a prior version of the software source file.

11. The non-transitory computer-readable storage medium of claim 7, further comprising instructions for in response to the input, capturing a root cause associated with the proposed change, and wherein determining whether to make said proposed change is based, at least in part, on the captured effort level and the root cause.

12. The non-transitory computer-readable storage medium of claim 8, wherein: the source control management system capturing the effort level includes the source control management system capturing a task ID associated with the proposed change by receiving, from the user, a user-specified task ID; and
validating the captured effort level includes validating the task ID to ensure that the task ID is a valid task ID.

* * * * *